United States Patent
Ellwood

(10) Patent No.: US 12,088,111 B2
(45) Date of Patent: Sep. 10, 2024

(54) CHARGER WITH TWO COILS FOR WIRELESS CHARGING

(71) Applicant: RENESAS DESIGN AUSTRIA GMBH, Graz (AT)

(72) Inventor: Stephen Ellwood, Graz (AT)

(73) Assignee: RENESAS DESIGN AUSTRIA GMBH, Graz (AT)

(*) Notice: Subject to any disclaimer, the term of this patent is extended or adjusted under 35 U.S.C. 154(b) by 0 days.

(21) Appl. No.: 18/291,490

(22) PCT Filed: May 24, 2022

(86) PCT No.: PCT/EP2022/063958
§ 371 (c)(1),
(2) Date: Jan. 23, 2024

(87) PCT Pub. No.: WO2023/020724
PCT Pub. Date: Feb. 23, 2023

(65) Prior Publication Data
US 2024/0266873 A1    Aug. 8, 2024

(30) Foreign Application Priority Data
Aug. 20, 2021  (EP) .................................. 21192274

(51) Int. Cl.
*H02J 50/10* (2016.01)
*H02J 50/00* (2016.01)
(Continued)

(52) U.S. Cl.
CPC .......... *H02J 50/005* (2020.01); *H02J 50/001* (2020.01); *H02J 50/12* (2016.02); *H02J 50/402* (2020.01); *H02J 50/80* (2016.02)

(58) Field of Classification Search
CPC ..................................................... H02J 50/005
(Continued)

(56) References Cited

U.S. PATENT DOCUMENTS 9,882,610 B1* 1/2018 Baker ..................... H04W 4/80
2020/0146632 A1   5/2020 Niichel et al.
2021/0268244 A1* 9/2021 Niichel ................ A61K 9/0053

FOREIGN PATENT DOCUMENTS

CN    109617263 A    4/2019
EP    3 182 585 A1   6/2017
(Continued)

OTHER PUBLICATIONS

Int'l Search Report and Written Opinion issued in corresponding PCT Appln. No. PCT/EP2022/063958, dated Sep. 23, 2022.

*Primary Examiner* — Edward Tso
*Assistant Examiner* — Ahmed H Omar
(74) *Attorney, Agent, or Firm* — Merchant & Gould P.C.

(57) ABSTRACT

A system of a power device and a portable device for wireless charging of a battery of the portable device, which power device comprises a first antenna to emit a magnetic field and which portable device comprises a portable antenna exposed to the magnetic field and connected to a charge stage to rectify an antenna signal from the portable antenna and to provide a charge voltage ($U_I$) to charge the battery wherein the power device comprises a second antenna realized identical as the first antenna and arranged in a distance (L) to the first antenna and on the same coil axis (A) as the first antenna to generate a Helmholtz magnetic field and wherein a first power amplifier directly connected to the first antenna and a second power amplifier directly connected to the second antenna are realized identical and on the same substrate.

7 Claims, 1 Drawing Sheet

(51) Int. Cl.
*H02J 50/12* (2016.01)
*H02J 50/40* (2016.01)
*H02J 50/80* (2016.01)

(58) Field of Classification Search
USPC .......................................................... 320/108
See application file for complete search history.

(56) References Cited

FOREIGN PATENT DOCUMENTS

| EP | 3 318 182 A1 | 5/2018 |
|---|---|---|
| KR | 10-2012-0110927 A | 10/2012 |
| KR | 10-2012-0127991 A | 11/2012 |

\* cited by examiner

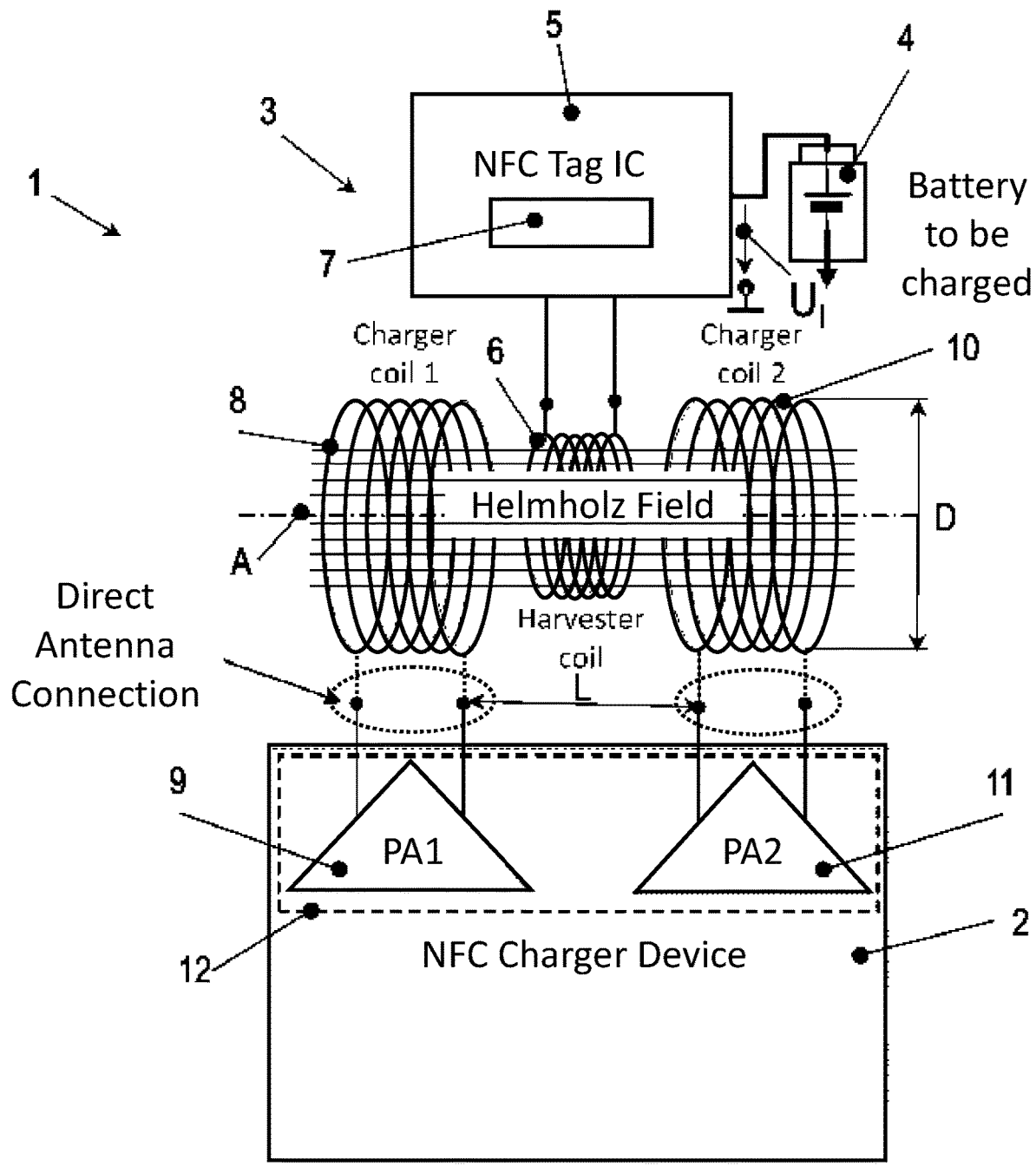

CHARGER WITH TWO COILS FOR WIRELESS CHARGING

CROSS REFERENCE TO RELATED APPLICATIONS

This application is a National Stage Application of PCT/EP2022/063958, filed 24 May 2022, which claims benefit of the European Application No. 21192274.5, filed 20 Aug. 2021 and which applications are incorporated herein by reference. To the extent appropriate, a claim of priority is made to each of the above disclosed applications.

FIELD OF THE INVENTION

The present invention relates to a system of a power device and a portable device for wireless charging of a battery of the portable device, which power device comprises a first antenna to emit a magnetic field and which portable device comprises a portable antenna exposed to the magnetic field and connected to a charge stage to rectify an antenna signal from the portable antenna and to provide a charge voltage to charge the battery.

BACKGROUND OF THE INVENTION

Wireless charging is used for all kind of different portable devices like a mobile phone or earphones. The portable device just has to be dropped close-by a power device or charger that generates and radiates a magnetic field via an antenna of the power device with the advantage that no wire is needed to charge the portable device. In some of these systems, the power device just radiates the magnetic field and some newer systems comprise a feedback loop from the portable device to the power device to regulate the power of the magnetic field.

There are standards like ISO/IEC18000-3 or ISO/IEC 14.443 Type A and B or ISO15.693 or ECMA-340 13.56 MHz Near Field Communication (NFC) or the NFC Forum or company standards like Felica from company Sony that define protocols and types of modulation used to transmit information between a portable device like a passive or active tag and a reader. Some or all of these standards in the RFID area define, to use an amplitude modulation to transmit an amplitude modulated data signal with digital data within the RF-Field over the air to the tag. ISO14.443 Type A for instance furthermore defines to use a modified Miller encoding to encode the data signal into an encoded data signal for the transmission.

In a wireless charging mode for portable devices in the RFID area quite often a square wave signal is radiated from the first antenna of the power device to the portable antenna of the portable device. To transfer maximum power in resonance and to get rid of the harmonic multiples in the portable antenna caused by the square wave signal an external matching component or EMC filtering has to be implemented, which makes the realization of the portable device more complex and expensive.

In a NFC legacy system the power device rediates a magnetic field using an inductive element as first antenna that rediates the magnetic field in a sufficient large area to charge the portable device. The magnetic field so created is a doughnut shape with magnetic flux lines emanating in a circular pattern around the coil of the first antenna. The portable antenna, when inside the field of the power device, had a voltage induced across it allowing power to be transferred in a process called energy harvesting. The amount of energy available to be harvested is strongly correlated with the distance between the first antenna of the power device and the portable antenna with available power dropping off significantly in only a few millimeter, which makes it difficult to provide an instruction for the user about the charging time.

SUMMARY OF THE INVENTION

It is an object of the invention to provide a system of a power device and a portable device for wireless charging of the battery of the portable device with an improved energy harvesting and a short and reliable charging time.

This object is achieved in a system with a power device that comprises a second antenna realized identical to the first antenna and arranged in a distance to and on the same coil axis of the first antenna to generate a Helmholtz magnetic field and wherein a first power amplifier directly connected to the first antenna and a second power amplifier directly connected to the second antenna are realized identical and on the same substrate.

A person skilled in the art knows the physical effect found by Mr. Herman von Helmholtz back at the end of the 19th century when arranging two identical coils on the same coil axis and in a particular distance to generate a homogeneous or nearly uniform magnetic field between the coils. Until now this physical effect has been used to create uniform DC magnetic fields for applications for cancelling the earth's magnetic field or in the medical area for magnetic resonance tomography with huge magnets involved. For these use cases there is no resonant circuit and coils can be wired in series. Since NFC typically uses a resonant circuit, the resonant tank could be created by adding a capacitor to the series inductor pair. The issues with placing the inductors in series is that both the inductance and the series impedance is doubled, resulting in very small matching capacitance and the need for high voltage excitation. A person skilled in the art therefore was held off using this physical effect for RFID or NFC applications.

This inventive concept realizes an arrangement of the first antenna coupled directly to a first power amplifier and a second antenna coupled directly to a second power amplifier with the two antennas of the power device in the physical arrangement and limitation to generate a Helmholz field. Both antennas are identical and both power amplifier are realized on the same substrate, but drive electrically independent from each other the two antennas to generate one close to homogenous magnet field. In this inventive concept the portable antenna of the portable device is arranged within the Helmholz field arranged to enable a high energy harvesting within a short and reliable charging time for charging the portable devices in the RFID area. This solves above listed problems and a long felt need of users of such portable devices in the RFID area. It is enabled by using two separate resonant loops, allowing the coils of the first and second antenna to be driven from a low voltage power amplifier of typically 3,6V. This voltage is compatible with a small geometry enabled by CMOS processes typically used for NFC applications. Two separate identical, synchronous transmitters/power amplifiers are deployed in the power device. These can be matched in amplitude and phase for maximum coherence of the generated magnetic field. Since power is harvested from both coils the power output can be split between the two transmitters.

It is in particular advantageous to use two identical power amplifier realized as invented by the same applicant and described in the patent EP 3 182 585 B. The use of a direct digital resonant waveform synthesis power amplifier is advantageous to ensure that the series capacitors are sufficiently matched to ensure that both coils of the first and second antenna have the same resonant frequency.

These and other aspects of the invention will be apparent from and elucidated with reference to the embodiments described hereinafter. The person skilled in the art will understand that various embodiments may be combined.

BRIEF DESCRIPTION OF THE DRAWINGS

FIG. 1 shows a system according to the invention, which comprises a power device and a portable device with a battery to be charged wireless.

DETAILED DESCRIPTION OF EMBODIMENTS

FIG. 1 shows a first embodiment of a system 1 of a power device 2 and a portable device 3 with a battery 4 according to the invention. The portable device 3 could be any device like e.g. earphones or a mobile phone with a wireless interface and a battery 4. The portable device 3 according to this embodiment complies with the NFC Standard and comprises a NFC Tag IC 5 connected to a portable antenna 6. In an active mode of the portable device 3 a magnetic field with the frequency of 13.56 MHz is radiated to transmit and receive data from other passive or active devices that comply with the NFC Standard. Battery 4 is used to power the NFC Tag IC 5 in its active mode. Battery 4 is a Li-Ion battery that needs to be charged by a charge stage 7 in different time periods with different charge currents and charge voltages. To enable charging of battery 4 with a charge voltage $U_I$ provided by charge stage 7, portable device 3 in its charging mode needs to harvest enough energy from the magnetic field provide by power device 2, to which portable antenna 6 is exposed.

Power device 2 could be a charging device connected to the power grid or powered by a battery power pack. Power device 2 comprises a first antenna 8 directly connected to a first power amplifier 9 to supply and drive the first antenna 8 resonant at the resonance frequency of 13.56 MHz. Power device 2 furthermore comprises a second antenna 10 directly connected to a second power amplifier 11 to supply and drive the second antenna 10 resonant at the same resonance frequency of 13.56 MHz. In addition to that, both power amplifier 9 and 11 drive the antennas 8 and 10 with the same phase and amplitude. To achieve that the first antenna 8 and the second antenna 10 are built as much as possible identical and both power amplifier 9 and 11 are realized as much as possible identical and exposed to the same operating temperature.

With regard to the antennas 8 and 10 "identical" means the same number of windings and the same material of the antenna coils and as much as possible the same geometrical form of the antenna coils. The geometrical form could be a circular or square cross-section to name two of the most common geometrical forms to be used for the invention, but other forms like a triangle could be used as well. With regard to the power amplifier 9 and 11 "identical" means the same manufacturing technology like CMOS for instance and the same circuitry realized. Furthermore to ensure that both power amplifier 9 and 11 are exposed to the same operating temperature they are realized residing on the same monolithic silicon substrate or die with or without interlocking areas on the substrate. As a result both power amplifier 9 and 11 keep the same operating temperature during the charging mode what ensures that the amplitude, phase and frequency of the antenna signal to drive the antennas 8 and 10 stay close to identical or identical for both power amplifier 9 and 11. Some or all of these measures may be combined to realize the power device 2 with only substantially or more or less identical two sets of antenna and power amplifier.

Power device 2 comprises a housing to mechanically hold the first antenna 8 in a distance L to the second antenna 10 and both antennas 8 and 10 are realized on the same coil axis A to generate a so called Helmholtz magnetic field that is close to homogenous in an area between the antennas 8 and 10. The housing of power device 2 is designed in a way together with the housing of portable device 3 to enable to insert the portable antenna 6 of portable device 3 in a charging position into this area between antennas 8 and 10. In this charging position the portable antenna 6 with its antenna coil axis is as much as possible exact positioned in the coil axis A of the antennas 8 and 10. Furthermore first antenna 8 and second antenna 10, if realized with circular windings, haven an area of the circular cross-section equal or greater with an equal or greater diameter D than the circular cross-section and diameter of portable antenna 6. In case first antenna 8 and second antenna 10 are realized with a square cross-section, they will have an area of the square cross-section equal or greater with an equal or greater side length than that of the portable antenna 6 of the portable device 3. The more of these measures are combined, the better it is ensured that portable antenna 6 is exposed to a close to ideal homogenous magnetic field with maximal energy harvesting for portable device 3.

First power amplifier 9 and second power amplifier 11 are realized as high-voltage digital power amplifier with a digital control section to output a digital wave-forming bit combination of N bits with a clock frequency M-times the resonance frequency of antennas 6, 8 and 10. Increments are added to provide a substantial sinusoidal output current to the first antenna 8 and second antenna 10. Such a power amplifier is disclosed in the patent EP 3 182 585 B. Each of these power amplifier 9 and 11 generate a voltage of 7,2V from a 3,6V supply what enables to harvest and generate the charge voltage $U_I$ needed for charge stage 7 to charge battery 4. A DC-DC converter needed in state of the art systems with state of the art power devices and portable device. The use of a sinus current to drive the first antenna 8 and second antenna 10 compared to the use of a square-wave current comprises the advantage that the portable device 3 does not need an EMC filter to filter all those harmonic multiples caused by the square-wave signal. In another embodiment of the invention other identical power amplifier that generate a sinus waveform or other waveform may be used.

The inventive use of two parallel resonant units of one power amplifier connected directly to the antenna with power amplifiers 9 and 11 operating at low voltages of 3,6V allows to use standard CMOS processes down to 40 nm technology nodes without using high voltage devices. Furthermore compatibility with battery charger systems e.g. Li-Ion sources without the need for expensive, large and inefficient DC-DC converter technologies from 3,6V to 7,2V. The use of the Helmholz magnetic field increases the effective distance between first antenna 8 and second antenna 10 and the energy harvesting portable antenna 6 leading to an easier industrial design and more repeatable end user experience.

The invention claimed is:

1. A system comprising a power device and a portable device, wherein the portable device comprises a battery and the power device is configured to wireless charge the battery of the portable device, the power device comprises a first antenna to emit a magnetic field and the portable device comprises a portable antenna exposed to the magnetic field and connected to a charge stage to rectify an antenna signal from the portable antenna and to provide a charge voltage ($U_l$) to charge the battery wherein the power device comprises a second antenna realized identical as the first antenna and arranged in a distance (L) to the first antenna and on the same coil axis (A) as the first antenna to generate a Helmholtz magnetic field and wherein a first power amplifier directly connected to the first antenna and a second power amplifier directly connected to the second antenna are realized identical and on the same substrate, wherein the first power amplifier and the second power amplifier are realized in CMOS residing on the same monolithic silicon substrate and operating at low voltages of 3,6V.

2. The system according to claim 1, wherein the first power amplifier and the second power amplifier are realized to provide a substantial sinusoidal output current to the first antenna and to the second antenna.

3. The system according to claim 1, wherein the identical realized first antenna and second antenna comprise the same number of windings and have a circular or square cross-section, which enclose an area equal or greater than the cross-section of the portable antenna of the portable device, which is realized with the same cross-section as the first antenna and the second antenna.

4. The system according to claim 3, wherein the distance (L) between the first antenna and the second antenna is less than the diameter (D) of the circular shaped first antenna and second antenna or less than the side length of a square shaped first antenna and second antenna to ensure a Helmholz magnetic field between the first antenna and the second antenna.

5. The system according to claim 1, which power device comprises a housing to mechanically hold the portable device in a charging position wherein the portable antenna of the portable device is arranged between the first antenna and the second antenna and substantially on the same coil axis (A) of the first antenna and the second antenna.

6. The system according to claim 1, wherein the first power amplifier and a second power amplifier are realized to drive the first antenna and the second antenna at the same resonance frequency in resonance and that the portable device is realized to drive the portable antenna at the same resonance frequency as the power device in resonance.

7. The system according to claim 1, which portable device comprises a wireless data interface that is realized as NFC interface that complies with the standard ISO18.092.

* * * * *